United States Patent
Lu (10) Patent No.: US 8,434,137 B2
(45) Date of Patent: Apr. 30, 2013

(54) METHOD OF SECURELY LOGGING INTO REMOTE SERVERS

(75) Inventor: HongQian Karen Lu, Austin, TX (US)

(73) Assignee: Gemalto SA, Meudon (FR)

( * ) Notice: Subject to any disclaimer, the term of this patent is extended or adjusted under 35 U.S.C. 154(b) by 1252 days.

(21) Appl. No.: 12/293,632

(22) PCT Filed: Mar. 22, 2007

(86) PCT No.: PCT/IB2007/000729
§ 371 (c)(1),
(2), (4) Date: Sep. 25, 2008

(87) PCT Pub. No.: WO2007/107868
PCT Pub. Date: Sep. 27, 2007

(65) Prior Publication Data
US 2010/0169962 A1 Jul. 1, 2010

Related U.S. Application Data

(60) Provisional application No. 60/786,111, filed on Mar. 22, 2006.

(51) Int. Cl.
*H04L 29/06* (2006.01)
(52) U.S. Cl.
USPC ................................................ 726/9; 726/28
(58) Field of Classification Search ................ 726/1–10, 726/26–30
See application file for complete search history.

(56) References Cited

U.S. PATENT DOCUMENTS

| 2003/1497891 | 8/2003 | Yared et al. |
| 2004/0143559 A1* | 7/2004 | Ayala ............................. 706/13 |
| 2005/0071282 A1 | 3/2005 | Lu et al. |

(Continued)

FOREIGN PATENT DOCUMENTS
WO WO2005064889 A 7/2005

OTHER PUBLICATIONS

Von Ahn, L et al, "CAPTCHA: Using Hard AI Problems for Security", LNCS, Proceedings of Eurocrypt 2003, vol. 2656/2003, Feb. 19, 2004, pp. 294-311, XP009091663, Berlin, The whole document.

*Primary Examiner* — Kambiz Zand
*Assistant Examiner* — John B King
(74) *Attorney, Agent, or Firm* — The Jansson Firm; Pehr B. Jansson (57) ABSTRACT

The invention relates to a system comprising a network device (NSC), a host computer (HOST) and a remote server remote (SRV). The host computer (HOST) and the network device (NSC) server are connectable through a network. The host computer (HOST) and the remote server (SRV) are connectable through the Internet. The smart network device (NSC) comprises a web server accessible from the host computer (HOST). The network device (NSC) is set to store a user's authentication credential. The host computer (HOST) is set to display a web page produced by the remote server (SRV) to the user. The remote server (SRV) is set to include a login link in said web page, the login link pointing to said web server. The web server is set to display a login page to the user on the host computer (HOST) when the user clicks on said login link, in order to authenticate the user. Upon authentication of the user, the network device (NSC) is set to send the user's authentication credential to the remote server (SRV) in order to authenticate the user to the remote server (SRV).

23 Claims, 3 Drawing Sheets

U.S. PATENT DOCUMENTS

2005/0091171 A1* 4/2005 Grobman .................. 705/64
2007/0050845 A1* 3/2007 Das et al. .................. 726/17
2007/0156592 A1* 7/2007 Henderson ................. 705/51
2008/0104224 A1* 5/2008 Litofsky et al. ............. 709/224

* cited by examiner

METHOD OF SECURELY LOGGING INTO REMOTE SERVERS

CROSS-REFERENCE TO RELATED APPLICATIONS

This application is a non-provisional application claiming priority from provisional application 60/786,111, filed on Mar. 22, 2006, entitled "A Method of Securely Login to Remote Servers", the teachings of which are incorporated by reference herein as if reproduced in full below.

BACKGROUND OF THE INVENTION

1. Field of Invention

The invention relates to network devices such as network smart cards, to systems comprising such devices, and to methods for authenticating users with network devices.

2. Description of the Related Art

Network smart cards are smart cards with networking capabilities, described in particular in US20050108571 ("Secure Networking Using a Resource Constraint Device" Lu, H. K., Montgomery, M. and Ali, A.). A network smart card is a smart card that is also an Internet node. The network smart card implements standard Internet protocols and security protocols inside the card.

Being an Internet node that is secure, portable, and tamper resistant, a network smart card can be used to secure online transactions and to prevent online identity theft, as explained in particular in WO2005048087 ("System and Method for Preventing Identity Theft Using a Secure Computing device", Lu, H. K. and Ali, A.).

One of the currently most common, almost universal, online user experience to login to a remote service provider (i.e. server) is summarized below.

As an example, an online user John Smith wants to access his online banking account with AbcBank*com.[1] The following is a typical sequence of events:

1. John Smith goes to the bank's website. He types in www*AbcBank*com into his browser. A web page from AbcBank*com shows up.
2. (Optional) John Smith views some new offerings by the bank and may visit other pages, which do not require login.
3. John Smith clicks the login link (or button).
4. A login page shows up. John Smith enters his user name and password, and clicks "Go".
5. A post-login page from AbcBank*com shows up, which may say "Welcome John Smith".

[1] In conformity with 37 CFR 1.57(d) which prohibits use of executable hyperlinks in patent documents, this document uses asterisks in lieu of periods in example hyperlinks. In actual practice, these asterisks would, of course, be periods.

A user goes through a similar experience when going to other websites where he has accounts, for example, ebay*com. In an online shopping case, Step 2 is typically for shopping around. When the user decides to buy something, he clicks login (Step 3).

It is well known that using user name and password is not secure because a spyware, for example, a keystroke logger, could steal the username and password without user's notice. A spoofed website can also trick the user to enter his login credential. In addition, good passwords are hard to remember while poor ones are easy to guess by attackers. To achieve better a security, various methods have been proposed.

Various mechanisms have been proposed to alleviate this problem. For example, some hardware tokens automatically fill-in the username and password and some websites ask users to enter more information. These methods may make it more difficult to steal login credentials, but cannot prevent spyware, Trojan horses, spoofed websites and others from stealing the information because the username, password, and others are still entered one way or another to the users' computer in clear formats. There are also One Time Password (OTP) devices and methods. But the weaknesses of OTP are well documented. Issues associated with current solutions are highlighted below.

1—Conventional Smart Cards:

Smart cards are typically used to secure network access, for example, for a corporate or a private network. A user inserts a smart card to his computer, which may be on or off a network. He types in a password to login to his computer. This provides a two-factor authentication: what you know (password) and what you have (the card). Recently, new smart cards have been introduced and allow a user to use a smart card to login to remote servers using the methods described in the next two sections (less secure than regular smart cards but more convenient in certain applications). These new methods are more secure than conventional username and password scheme, but sometimes an attacker can still break them without too much trouble.

2—Form-Fill (Can be Embedded in a Smart Card):

Some password management software and hardware tokens allow users to register their usernames and passwords. When logging into a remote server, the software or the token automatically fills-in the username and password into the login form. Such method is convenient for the user and may make it more difficult to steal login credentials. However, the form-fill method cannot prevent spyware, Trojan horses, spoofed websites and others from stealing the information, because the username and password are still entered one way or another to the users' computer in clear formats.

3—One-Time Passwords (Can be Embedded in a Smart Card):

As its name indicates, the one-time password (OTP) is used exactly once, after which it is no longer valid. It is a very strong defense against eavesdroppers, who might captures user's input to the computers. There are various ways to implement one-time password. The most secure ways involve using hardware tokens or called handheld authenticators. The OTP is typically used with username and password, providing a two-factor authentication. The following outlines several representative one-time password mechanisms.

3.1—Time-Based One-Time Passwords

The time-based OTP uses a clock and a secret key as the inputs to some function to compute the one-time password. The user holds a secure token, which has a secret key, an internal clock that is synchronized with the authentication server, and a display. The user may need to enter a PIN to use the secure token. The display shows some function of the current time and the secret key. It changes over time. The user enters the displayed value as the password to login to the server. The server consults with the authentication server to identify the user. The authentication server uses its copy of the secret key, the clock, and the same function to compute the response. If the response matches with the user's password, the authentication server confirms the user's identity. The function used for computing the response may be some cryptographic algorithm, as explained in particular in Cheswick, W. R., Bellovin, S. M., and Rubin, A. D., "Firewalls and Internet Security, Second Edition," Addison-Wesley, 2003.

Some OTP mechanisms use some kind of sequence number, such as a transaction number, instead of time. The basic method is similar to time-based OTP.

3.2—Challenge/Response One-Time Passwords

The challenge/response OTP uses a non-repeating challenge from the authentication server. The response is a function of the challenge and a shared secret between the server and the client. The response may be computed by client software or a hardware token, or even by the user (in his mind). The hardware token is the strongest authentication tool. The user enters the PIN and the challenge to the token. The token computes the response from the challenge and the secret key; and displays the response as the password. Because no clock or sequence number involved, this method does not have synchronization problem, as explained in particular in Cheswick, W. R., Bellovin, S. M., and Rubin, A. D., "Firewalls and Internet Security, Second Edition," Addison-Wesley, 2003. However, it does require the user to do a little more work to enter the challenge. It is a different trade-off between security and convenience.

3.3—Smart Card Based One-Time Passwords

Recently, some companies have demonstrated smart card based OTP methods. These methods use a hardware token that is a smart reader, has a display and a keypad. The smart card is inserted to the token. The user may authenticate himself to the smart card by entering a PIN through the token. Instead of the token generating the OTP, the smart card generates the OTP, which is displayed on the token. The OTP may be generated using sequence number based method or challenge/response based method. The user uses the OTP to login to the remote server.

As mentioned earlier, most of the existing OTP mechanisms have weaknesses, such as the following.

1. Private keys are used for computing the OTPs. The OTP server maintains the private keys of its clients. The key databases are attractive targets for attackers.

2. The OTP methods typically require client and server synchronization. The mechanism fails to work when the client and the server are out of synchronization.

3. The OTP typically has a fixed length, which may subject to authentication race attack on the last digit of the password.

SUMMARY OF THE INVENTION

It is an aim of the invention to provide a new method for a user to securely login to a remote server over the Internet using a network smart card. The method protects consumers against online identity theft and, at the same time, provides convenience to the consumers. The method is not limited to the network smart card. It can be applied to other secure network devices as well.

The method of the invention is advantageous, because security and convenience are usually conflicting requirements. Very often, increased security means less convenience. If a method is too inconvenient or too foreign, few people will use it. Therefore the invention solves not simply the problem of how to secure the login process but also how to achieve convenience and provide familiarity to users at the same time.

The new method secures users' logins to remote websites using network smart cards while maintaining the current overall user login experience (that is, go to a website, look/shop around, and then login).

BRIEF DESCRIPTION OF THE DRAWINGS

The invention and its advantages will be explained more in details in the following specification referring to the appended drawings, in which.

DETAILED DESCRIPTION OF THE INVENTION

According to a preferred embodiment of the invention, the user's login credential for a remote server, e.g. AbcBank*com, is stored securely in his network smart card. The card uses a secure channel (encryption) to send the user's login credential directly to the remote server. Because of the secure channel, the login credential is never in the user's computer in a clear format. Therefore, spywares cannot comprehend the information. The secure channel is established via mutual authentication between the remote server and the network smart card. Therefore the card is able to reject a spoofed website that tries to steal people's online identities.

On the other hand, because the user's smart card stores his login credentials securely inside the card, the user does not need to remember the username and password. This not only makes the login credential more secure as much stronger password can be used, but also is convenient for the user. The method maintains the current overall user login experience; hence, it provides familiarity to users. In addition, the method allows Internet service providers to choose workflows that best fit their requirements for balancing security and convenience.

AbcBank*com is only an example to describe the new method. The method can be applied to any online service provider who is willing to use network smart cards.

Figure 1:
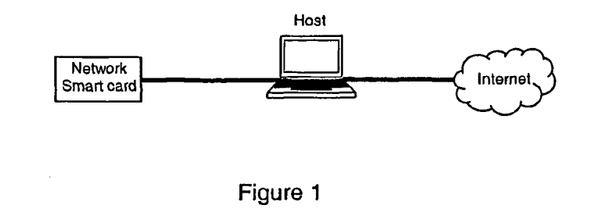
FIG. 1 represents a network smart card NSC connecting to the network INTERNET via a host computer HOST.

FIG. 1 illustrates a network smart card NSC that connects to the Internet INTERNET through a host computer HOST. The network smart card NSC can provide services or access resources over the Internet INTERNET.

One form factor of the network smart card NSC is a USB token. To use it, the user plugs the network smart card NSC token into a USB port on the host computer HOST. The network smart card NSC and the host HOST will setup the needed network configuration. The user can then uses the services provided by the card. The network smart card NSC does no need smart card specific middle ware installed on the host computer HOST.

Figure 2:
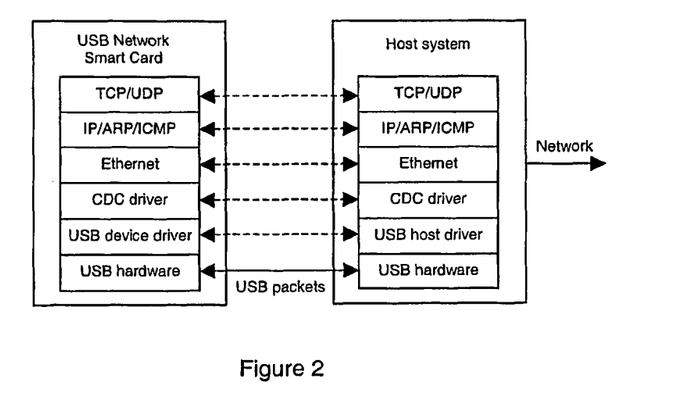
FIG. 2 represents network stacks in a USB network smart card NSC and a host computer HOST.

The network protocol stack on the network smart card NSC is the same as those on other Internet nodes.

As can be seen on FIG. 2 the Internet security protocols SSL/TLS, and Internet applications may be built on top of the network protocol stack. Details of security protocols and applications are well known.

The network packets sent to the card are preferably Ethernet frames. Above the Ethernet layer, the card preferably implements the following protocols:

1. Internet Protocol (IP)

2. Address Resolution Protocol (ARP)

3. Transmission Control Protocol (TCP) for reliable transmissions

4. User Datagram Protocol (UDP) for asynchronous applications (e.g. DNS requests)

To facilitate network connectivity, the network smart card NSC preferably also implements the following protocols:

5. Dynamic Host Configuration Protocol (DHCP) server to configure the network smart card NSC—host HOST network and 6. Domain Name Server (DNS) for domain name resolution.

When the network smart card NSC is plugged into the host computer HOST, the host computer HOST and the network smart card NSC typically establish a network connection. The host computer HOST typically sends DHCP requests and the network smart card NSC typically sends DHCP responses. The interface between the network smart card NSC and the host computer HOST, hereinafter referred to as the card-host interface, is configured such that the DNS server is on the card. The host computer HOST typically provides routing for the network smart card NSC to access the Internet, as explained in particular in "Smart Cards; New UICC-Terminal Interface; TCP/IP Connectivity between UICC and Terminal," Technical Specification, Release 7, ETSI TS 102 YYY, V0.1.0, December 2005.

The network smart card NSC for a particular application, say the application for AbcBank*com, has a unique generic domain name; for example, AbcBank*com. The network smart card NSC can also have a specific domain name, for example, JohnSmith*smartcard*AbcBank*com, as explained in particular in "Smart Cards; New UICC-Terminal Interface; TCP/IP Connectivity between UICC and Terminal," Technical Specification, Release 7, ETSI TS 102 YYY, V0.1.0, December 2005.

At the application level, the network smart card NSC has a secure web server that can be accessed by the host computer HOST that the network smart card NSC is connected to. The network smart card NSC is also a client that can establish secure connections with remote Internet servers SRV.

Thanks to the method according to the invention, the user's overall login experience is similar to the most common experience described earlier. One difference lies in the way that the actual login is performed. Instead of entering the username and password to a browser window, the user asks his network smart card NSC to login for him.

The details of the secure login according to a preferred embodiment of the invention are explained below. In particular, the following aspects of the inventions are explained:

1. How does the web page from the secure remote server of AbcBank*com know where Smith's network smart card NSC is?

2. How does the secure remote server SRV of AbcBank*com associate Smith's login from the network smart card NSC with the web browser session, B1, which Smith uses to click login?

Figure 3:
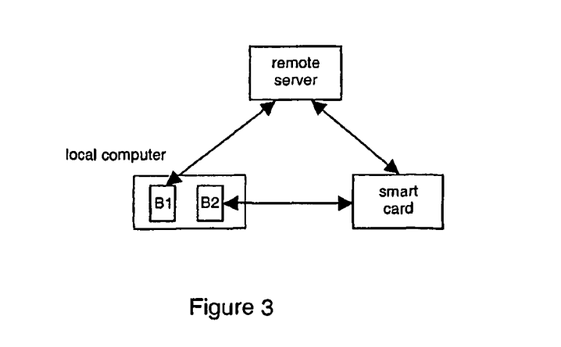
FIG. 3 represents logical connections between browsers sessions B1, B2 on the local computer HOST, a network smart card NSC and the remote server SRV.

The following descriptions are based on the assumption that the remote server SRV of AbcBank*com is authentic and secure. The terms remote server of AbcBank*com and AbcBank*com are used interchangeably. FIG. 3 illustrates the logical connections between the remote server SRV, the network smart card NSC, and the browsers sessions B1, B2, on the local computer HOST that the network smart card NSC is connected to.

As described earlier, network smart cards NSC for a particular application, say the application for AbcBank*com, have a unique generic domain name; for example, smartcard*AbcBank*com. A web page from the remote server SRV, AbcBank*com, contains a login link that a user can click. Instead of linking to the login web page of the remote server SRV, the link contains a generic domain name of the network smart card NSC; for example, https*smartcard*AbcBank*com. The link also specifies that the target window is a new window, which enables a network smart card NSC's web page to show up in the new window. The following is an example of the html code for this purpose:

```
<*a href="https*smartcard*AbcBank*com?RemoteServerName=AbcBank" target="_blank>*/a*>.
```

The card-host interface is configured via DHCP, while the network smart card NSC provides a DHCP server and a DNS server (as explained above). The DNS server on the network smart card NSC resolves the generic domain name, smartcard*AbcBank*com, which provides the IP address of the network smart card NSC. This enables the new instance of the browser (new window) to display the network smart card NSC's login page for the AbcBank*com application. This explains how the web page from the secure remote server of AbcBank*com knows where Smith's network smart card is.

The parameter, RemoteServerName, in the above html code is optional. If the network smart card NSC is only used for logging into one remote server SRV, the network smart card NSC knows the remote server SRV that it should contact; therefore, it does not need this parameter. However, for a network smart card NSC that can do login for its owner to multiple online service providers, the RemoteServerName parameter becomes handy. It enables the application layer in the network smart card NSC to know which remote server SRV that the user wants to login. On the other hand, the DNS server embedded in the network smart card NSC can also inform the application layer about the name.

How the secure remote server SRV of AbcBank*com can associate Smith's login credentials from the network smart card NSC with the web browser session B1 that Smith uses to click login is explained below.

When the user clicks the login in the web page from AbcBank*com in browser session B1, a script that came with the web page sends a request to AbcBank*com asking for a Session ID. This can be done, for example, by a javascript and XMLHttpRequest object.

Alternatively, the session ID can come with the web page displayed in B1 instead of being obtained dynamically. However, this requires a session ID for every web page that the user may click login.

The session ID is passed to the secure web server on the network smart card NSC in the https request through browser session B2. The following is an html code example:

```
<*a href="https*smartcard*AbcBank*com
    ?Session+ID=NewSessionID&RemoteServerName=AbcBank"
target="_blank"*Login*/a*>
```

This is the link corresponding to the login button in the web page in browser session B1. It enables to open a new window for browser session B2, with browser session B2 connecting to the network smart card NSC, smartcard*AbcBank*com, via https with parameter Session ID. The web server on the network smart card NSC responds to the browser session B2 with the login page of the network smart card NSC.

The user logs into his network smart card NSC using a secure mechanism provided by the card, as explained in particular in WO2006100554 (Montgomery, M. and Ali, A., "A Method of Secure Login on Insecure Systems"). After successfully authenticating the user, the network smart card NSC can connect to the remote server SRV of AbcBank*com securely and directly through a secure SSL or TLS channel. Depending on application requirements, the network smart card NSC might automatically connect to AbcBank*com after the user logs into the network smart card NSC or let the user decide when to connect to the remote server SRV.

The network smart card NSC connects to the remote server SRV via SSL or TLS. During SSL/TLS handshaking, the network smart card NSC and the remote server SRV perform mutual authentication. If the authentication fails, the network smart card NSC will not continue communication with the remote server SRV. This prevents the user from logging into a spoofed server, which is caused by DNS poisoning, for example.

Once a secure channel is established, the network smart card NSC sends the user's login credential for AbcBank*com and the session ID securely to the remote server SRV. The information is encrypted inside the network smart card NSC and decrypted by the remote server SRV. No one on the network path, including the host computer HOST, can see the information in a clear format. This ensures the security and privacy of the user's login credential.

Now let us look back at the window of the browser session B1, which is connected to AbcBank*com. After the user clicks the login link in the window of browser session B1, and after a session ID is obtained from AbcBank*com, another script that came with the web page in browser session B1 sends a request to AbcBank*com, asking for a post-login web page. This can be done, for example, using a javascript and XMLHttpRequest. The request includes the session ID. The remote server SRV, AbcBank*com, associates this request with a login from a network smart card NSC using the session ID. Upon successfully and securely communicates with the network smart card NSC and gets user's login credential, the remote server SRV responds to the request from the browser session B1 with the requested post-login page. Depending on the security level setting of the login process, Smith is either logged in or is asked to do a post-login confirmation, as explained below.

Ways to further enhance security to the basic mechanism described above are explained below. These security measures prevent potential malicious programs on the local host computer HOST or remote computers from accessing the user's account.

Session Image:

For added security, when the script in browser session B1, which is connected to AbcBank*com, requests for a session ID, it requests for a Session Image as well. The dynamic and interactive capability of the web technology enables the session image be displayed somewhere in the window of the browser session B1 without reloading of a whole web page. The image is typically small and displays some distorted letters, which human can recognize easily but are very hard for a program to recognize. The string of the letters in the session image is denoted by S1. After the user logs into his network smart card NSC, he enters the string S1 to his network smart card NSC, for example, using the secure method provided by network smart card NSC, as explained in particular in WO2006100554 (Montgomery, M. and Ali, A., "A Method of Secure Login on Insecure Systems"). When sending the login credential and the session ID, the network smart card NSC sends the string S1 as well securely to the remote server SRV. The remote server SRV has established an association of the session ID with the string S1 before sending the session ID and the session image back to the browser session B1. By receiving both (session ID and S1) at the same time, the remote server SRV further assures that the user has initiated the login process.

Post-Login Confirmation:

After AbcBank*com successfully accepted the user's login credential, made association, and responded with a post-login page, before letting the user enters his account at AbcBank*com, the remote server SRV may want to further confirm that it is interacting with the user Smith via his browser session B1 instead of a malicious program. Examples of ways for the remote server SRV to distinguish a genuine human user from a malicious computer program include the following:

1. The post-login page might ask some questions that only Smith can answer correctly.

2. The remote server SRV sends the network smart card NSC a small image with distorted letters, which only human can easily recognize. The network smart card NSC sends the image to browser session B2 in its response to the login request. Smith enters the letters into the post-login page.

3. Similar as the example 2 above, a small image with distorted letters is sent from the remote server SRV, through the network smart card NSC, and displayed in the window of browser session B2. At the same time, a similar image is sent to browser session B1. As the post-login confirmation, the user is asked to compare the letters in the two images and answer some questions.

4. Similar as the example 3 above, except the images might contain things other than letters.

A basic workflow for securely login to a remote server SRV using a network smart card NSC is explained below. Although the basic workflow does not include the enhanced security features described above, it prevents online identity theft by securing users' login credentials. The basic workflow is described first from the user's perspective, and then from a technical perspective (as illustrated on FIG. 4.)

The following description is from the user's perspective.

1. John Smith goes the bank website: John Smith types in www*AbcBank*com into the window of his browser session B1. A web page from AbcBank*com shows up.

2. (Optional) John Smith looks at some new offerings by the bank and may visit other pages, which do not require login.

3. John Smith inserts his network smart card NSC to the host computer HOST. For example, if the network smart card NSC is a USB token, John Smith inserts the token into a USB port of the computer.

4. John Smith clicks the login link (or button) in the browser session B1. A window of the second browser session B2 pops up showing his network smart card NSC login page.

5. John Smith logs into his network smart card NSC using a secure mechanism provided by the network smart card NSC as explained in particular in WO2006100554 (Montgomery, M. and Ali, A., "A Method of Secure Login on Insecure Systems"), from browser session B2.

6. Browser session B2 displays a login confirmation in the window and tells John Smith to go back to browser session B1.

7. Browser session B1 displays a post-login web page from Abc*Bank*com. John Smith is logged in.

Figure 4:
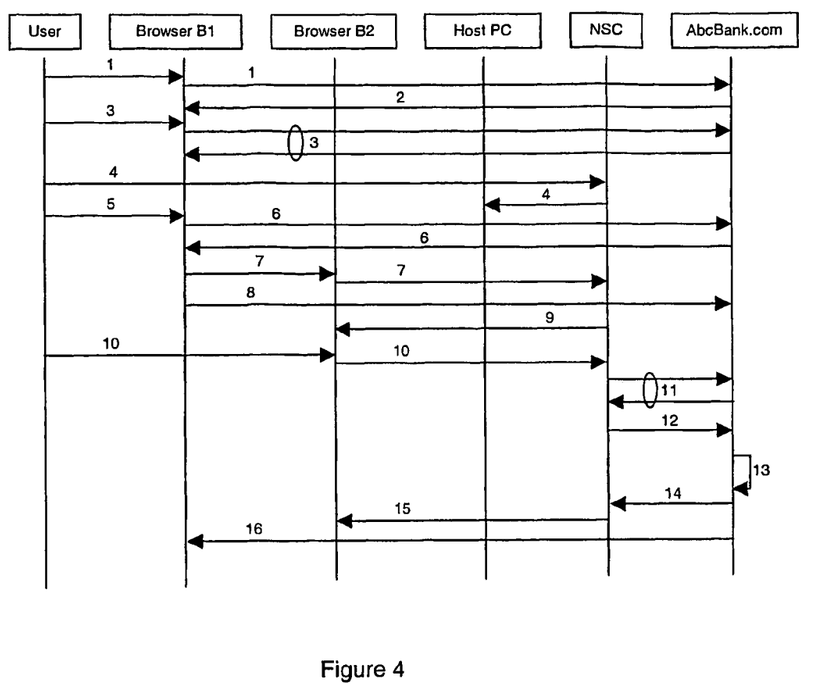
FIG. 4 is a sequence diagram of a basic login workflow.

FIG. 4 illustrates the basic workflow from technical perspective.

1. John Smith goes to the bank's website. John Smith types in www*AbcBank*com into a window of his browser session B1. The browser session B1 sends an http request to AbcBank*com.

2. AbcBank*com responds with a web page.

3. (Optional) John Smith looks at some new offerings by the bank and may visit other pages, which do not require login.

4. John Smith inserts his network smart card NSC to the host computer HOST. For example, if the network smart card NSC is a USB token, he inserts the USB token into a USB port of the host computer HOST. The network smart card NSC and the host computer HOST set up network configuration.

5. John Smith clicks the login link (or button) in browser session B1.

6. A script in browser session B1 sends a request to AbcBank*com asking for a session ID. AbcBank*com sends a session ID back.

7. The session ID is set as a parameter to the https link associated with the login button in a window displayed by browser session B1. A second window, from browser session B2, pops up, which sends an https request, with the session ID, to the network smart card NSC.

8. The browser session B1 sends an https request, with the session ID, to AbcBank*com requesting a post-login web page.

9. The network smart card NSC responds to the browser session B2 with the network smart card NSC login page, in answer to the request sent during step 7.

10. John Smith logs into his network smart card NSC using a secure mechanism provided by the network smart card NSC as explained in particular in WO2006100554 (Montgomery, M. and Ali, A., "A Method of Secure Login on Insecure Systems"), from browser session B2. Browser session B2 sends an https request to the network smart card NSC.

11. The network smart card NSC establishes a secure channel with AbcBank*com via mutual authentication.

12. The network smart card NSC encrypts John Smith's login credential and the session ID. It sends them to AbcBank*com.

13. The AbcBank*com does the following:
  a. Associates the network smart card NSC login and an https request via the session ID,
  b. Associates the login credential from the network smart card NSC with the user's account.

14. The AbcBank*com acknowledges to the network smart card NSC about the login. If the login fails, the user could either try again or try sometime later. If the login succeeds, the process continues to the next step.

15. The network smart card NSC responds to the request from browser session B2 (in step 10) with a login confirmation.

16. The AbcBank*com responds to the request from browser session B1 (in step 8) with a post-login web page to the window of browser session B1.

John Smith is logged in.

Advanced Workflows:

For secure login to a remote server SRV using a network smart card NSC, advanced workflows described below add security features, or a subset of them, to the basic workflow, in order to enhance the security of the process. For example, an advanced workflow may incorporate both the Session Image and post-login confirmation security features described above.

From user's perspective, an advanced workflow may appear as follows.

1. John Smith goes to the bank's website. John Smith types in www*AbcBank*com into a window of his browser session B1. A web page from AbcBank*com shows up.

2. (Optional) John Smith looks at some new offerings by the bank and may visit other pages, which do not require login.

3. John Smith inserts his network smart card NSC to the host computer HOST. For example, if the network smart card NSC is a USB token, John Smith inserts the USB token into a USB port of the host computer HOST.

4. John Smith clicks the login link (or button) in browser session B1. A second window from browser session B2 pops up showing John Smith network smart card NSC login page.

5. John Smith logs into his network smart card NSC using a secure mechanism provided by the network smart card NSC as explained in particular in WO2006100554 (Montgomery, M. and Ali, A., "A Method of Secure Login on Insecure Systems"), from browser session B2.

6. John Smith enters the string S1, which is displayed in a small image (Session Image) in a window of browser session B1, into the window displayed by the network smart card NSC in the other browser session B2. John Smith instructs his card to login to AbcBank*com by clicking, for example, a login link.

7. Browser session B2 displays a login confirmation and instructs John Smith to go back to browser session B1.

8. Browser session B1 displays a post-login web page from AbcBank*com for login confirmation. John Smith answers some question(s) on the page.

9. Browser session B1 displays a welcome page. John Smith is logged in.

Figure 5:
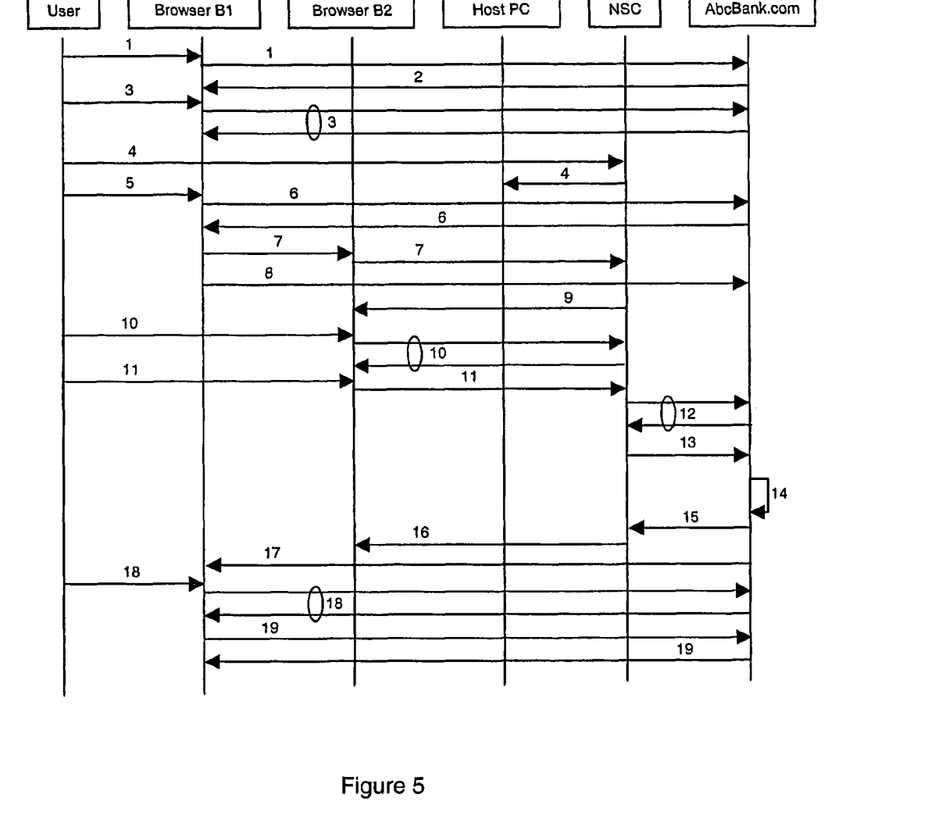
FIG. 5 is a sequence diagram of an advanced workflow.

The advanced workflow presented above is described below from a technical perspective. FIG. 5 illustrates the sequence diagram of this workflow.

1. John Smith goes to the bank's website. John Smith types in www*AbcBank*com into a window of his browser session B1. The browser session B1 sends an http request to AbcBank*com.

2. AbcBank*com responds with a web page.

3. (Optional) John Smith looks at some new offerings by the bank and may visit other pages, which do not require login.

4. John Smith inserts his network smart card NSC to the host computer HOST. For example, if the network smart card NSC is a USB token, he inserts the USB token into a USB port of the host computer HOST. The network smart card NSC and the host computer HOST set up network configuration.

5. John Smith clicks the login link (or button) in browser session B1.

6. A script in browser session B1 sends a request to AbcBank*com asking for a Session ID and a Session Image. AbcBank*com sends a pair of session ID and session image back. The session image is displayed in a window of the browser session B1.

7. The session ID is set as a parameter to the https link associated with the login button in browser session B1. A second window of browser session B2, pops up, which sends an https request, with the session ID, to the network smart card NSC.

8. The browser session B1 sends an https request, with the session ID, to AbcBank*com requesting for a post-login web page.

9. The network smart card NSC responds to the request of browser session B2 (sent in step 7) with the network smart card NSC login page.

10. John Smith logs into his network smart card NSC using a secure mechanism provided by the network smart card NSC as explained in particular in WO2006100554 (Montgomery, M. and Ali, A., "A Method of Secure Login on Insecure Systems"), from browser session B2.

11. John Smith enters the string S1, which is displayed in a small image (session image) in the window of browser session B1, into the window displayed by the network smart card NSC in browser session B2. John Smith instructs his network smart card NSC to login to AbcBank*com by clicking, for example, a login link. The browser session B2 sends an https request to the network smart card NSC.

12. The network smart card NSC establishes a secure channel with AbcBank*com via mutual authentication.

13. The network smart card NSC encrypts John Smith's login credential, session ID, and the string S1. It sends them to AbcBank*com.

14. The AbcBank*com does the following:
   a. Associates the network smart card NSC login and an https request via the session ID,
   b. Checks the correctness of session ID and string S1 association, and
   c. Associates the login credential from the network smart card NSC with the user account.

15. The AbcBank*com acknowledges to the network smart card NSC about the login. If the login fails, the user could either try again or try sometime later. If the login succeeds, the acknowledgement might contain a small image for post-login confirmation; the process continues to the next step.

16. The network smart card NSC responds to request of browser session B2 (sent during step 11) with a login confirmation, which might contain a small image originally sent from AbcBank*com for post-login confirmation.

17. The AbcBank*com responds to the browser session request sent during step 8 with a post-login confirmation web page to the browser window B1.

18. The user performs the post-login confirmation.

19. If the post-login confirmation succeeds, AbcBank*com lets the user know that his has logged into the system.

Network Smart Card NSC Insertion and Login

In the workflows described earlier, the user John Smith inserts his network smart card NSC before he clicks login in the browser session B1, which connects to AbcBank*com. After Smith clicks login in browser session B1, a second window (of browser session B2) pops up with a page from his network smart card NSC. Smith logs into his network smart card NSC.

There are at least two other possibilities for network smart card NSC insertion and login. John Smith may be already logged into the network smart card NSC and may forget to insert the network smart card NSC.

1. In a first embodiment, John Smith is already logged into his network smart card NSC before he clicks the login in an AbcBank*com web page in the browser session B1. In this case, one might wonder whether John Smith should login to his network smart card NSC again when he clicks the login button in B1. The network smart card NSC can be implemented in both ways outlined below.

a. Implementation 1—John Smith logs into his network smart card NSC again. Then the process is the same as described earlier. This first implementation is more secure.

b. Implementation 2—John Smith does not need to login to his network smart card NSC again. When the browser session B2 tries to access smartcard*AbcBank*com, the network smart card NSC finds that John Smith has already logged in. The network smart card NSC directly connects to AbcBank*com as described in the context of the basic workflow. It sends to the browser session B2 the next page in the advance workflow case. This second implementation is more convenient.

2. In a second embodiment, John Smith forgot to insert his network smart card NSC before clicking the login in the browser session B1. In this case, the browser session B2 will display a page-not-found error message. John Smith needs to close the browser session B2, to insert his network smart card NSC, and to click login in browser session B1 again.

One network smart card NSC can manage multiple login credentials for the user at different online service providers. For example, the user might use his network smart card NSC to store his login credentials for AbcBank*com, eBay*com, paypal*com, and so on. The DNS server on this network smart card NSC can resolve corresponding generic names (for example, smartcard*AbcBank*com, smartcard*eBay*com, smartcard*paypal*com) and specific names (for example JohnSmith*smartcard*AbcBank*com, JohnSmith*smartcard*eBay*com, JohnSmith*smartcard*paypal*com). The method of the invention enables the user to securely login to each of the online service providers supported by the network smart card NSC.

It is up to the service providers to decide who should be the issuer of the network smart card NSC if they share the same network smart card NSC.

Let us consider a network smart card, which can serve user login for multiple remote servers SRV. Let us consider that John Smith already used the network smart card NSC to login to AbcBank*com, and that John Smith now wants to use the network smart card NSC to login to another server, e.g. eBay*com. John Smith does not necessarily have to login to his NSC again. As explained earlier, the network smart card NSC may require John Smith to login again for better security, or not to require re-login for more convenience.

The network smart card NSC can be implemented in various form factors, for example, a credit card form factor or a USB token form factor. The network smart card NSC might have other kinds of low-level communication means than USB, for example, ISO 7816. The method is not limited to network smart cards either.

It can be used with other secure network devices as well.

The invention claimed is:

1. A system comprising a network device (NSC), a host computer (HOST) and a remote server (SRV), wherein the host computer (HOST) and the network device (NSC) are connectable through a first network, wherein the host computer (HOST) and the remote server (SRV) are connectable through the Internet, wherein the network device (NSC) comprises a web server accessible from the host computer (HOST), wherein the network device (NSC) is set to store a user's authentication credential, wherein the host computer (HOST) is set to display a web page produced by the remote server (SRV) to the user in a first browser session, the system further comprising:
   a. the remote server (SRV) is set to include a login link in said web page, the login link comprising a pointer that when resolved by a server assigned to resolve network addresses for the host is resolved into a network address that points to said web server on the network device (NSC) storing the user's authentication credentials;
   b. said host computer (HOST) is set to, in response to the user clicking on said login link, creating a second browser session connected to the network device (NSC) including a session ID for the first browser session;
   c. said web server on the network device (NSC) is set to display a login page to the user on the host computer (HOST) in the second browser session, in order to authenticate the user; and
   d. upon authentication of the user, the network device (NSC) is set to send the user's authentication credential to the remote server (SRV) in order to authenticate the user to the remote server (SRV) including the session ID for the first browser session thereby enabling the remote server (SRV) to link the authentication of the user by the network device (NSC) to the browser session with the user in the first browser session.

2. The system according to claim 1, wherein the login link contains a generic domain name of the network device (NSC), and wherein the network device (NSC) comprises a Domain Name Server set to resolve said generic domain name wherein the host computer (HOST) is set to receive a resolved network address of the generic domain name of the network device (NSC) from the network device (NSC) thereby enabling the host computer (HOST) to create the second browser session with the network device (NSC).

3. The system according to claim 1, wherein the login link further comprises a parameter identifying the remote server (SRV).

4. The system according to claim 1, wherein the web page further comprises the session identifier.

5. The system according to claim 1 wherein the web page further comprises a script set to request the session identifier from the remote server (SRV).

6. The system according to claim 5, wherein the session identifier is obtained by an XMLHttpRequest object.

7. The system according to claim 1, wherein the login page comprises a button, and wherein the user requests the network device (NSC) to send the authentication credential to the remote server (SRV) by clicking the button.

8. The system according to claim 1, wherein all communications between the network device (NSC) and the remote server (SRV) are encrypted by SSL or TLS.

9. The system according to claim 1, wherein the remote server (SRV) is set to include a CAPTCHA in the web page, wherein the user has to input the data displayed in the CAPTCHA into the host computer (HOST), wherein the host computer (HOST) is set to send said data to the network device (NSC), and wherein the network device (NSC) is set to send said data securely to the remote server (SRV).

10. The system according to claim 1, wherein the network device (NSC) is a network smart card.

11. The system according to claim 10, wherein the network device (NSC) is a USB token.

12. A method for authenticating a user of a host computer (HOST) to a remote server (SRV), wherein the user has a network device (NSC), wherein the network device (NSC) and the host computer (HOST) are connectable through a first network, wherein the host computer (HOST) and the remote server (SRV) are connectable through the Internet, wherein the user connects to the remote server (SRV) through a web page produced by the remote server (SRV) and displayed on the host computer (HOST) in a first browser session, wherein the network device (NSC) is set to store a user's authentication credential, wherein the network device (NSC) comprises a web server accessible from the host computer (HOST), the method comprising:
   a. the remote server (SRV) is set to include a login link in said web page comprising a pointer that when resolved by a server assigned to resolve network addresses for the host is resolved into a network address that points to said web server on the network device (NSC) storing the user's authentication credentials;
   b. said host computer (HOST) is set to, in response to the user clicking on said login link, creating a second browser session connected to the network device (NSC) including a session ID for the first browser session;
   c. said web server on the network device (NSC) is set to display a login page to the user on the host computer (HOST) in the second browser session, in order to authenticate the user; and
   d. upon authentication of the user, the network device (NSC) is set to send the user's authentication credential to the remote server (SRV) in order to authenticate the user to the remote server (SRV) including the session ID for the first browser session thereby enabling the remote server (SRV) to link the authentication of the user by the network device (NSC) to the browser session with the user in the first browser session.

13. The method according to claim 12, wherein the login link contains a generic domain name of the network device (NSC), and wherein the network device (NSC) comprises a Domain Name Server set to resolve said generic domain name wherein the host computer (HOST) is set to receive a resolved network address of the generic domain name of the network device (NSC) from the network device (NSC) thereby enabling the host computer (HOST) to create the second browser session with the network device (NSC).

14. The method according to claim 12 wherein the login link further comprises a parameter identifying the remote server (SRV).

15. The method according to claim 12 wherein the web page further comprises a the session identifier.

16. The method according to claim 12 wherein the web page further comprises a script set to request a the session identifier from the remote server (SRV).

17. The method according to claim 16, wherein the session identifier is obtained by an XMLHttpRequest object.

18. The method according to claim 12, wherein the login page comprises a button, and wherein the user requests the network device (NSC) to send the authentication credential to the remote server (SRV) by clicking the button.

19. The method according to claim 12, wherein all communications between the network device (NSC) and the remote server (SRV) are encrypted by SSL or TLS.

20. The method according to claim 12, wherein the remote server (SRV) is set to include a CAPTCHA in the web page, wherein the user has to input the data displayed in the CAPTCHA into the host computer (HOST), wherein the host computer (HOST) is set to send said data to the network device (NSC), and wherein the network device (NSC) is set to send said data securely to the remote server (SRV).

21. The method according to claim 12, wherein the network device (NSC) is a network smart card.

22. The method according to claim 21, wherein the network device (NSC) is a USB token.

23. The method according to claim 12, wherein the method comprises the following steps:
   a. The user types the address of the remote server (SRV) in a browser on the host computer (HOST);
   b. The user connects his network device (NSC) with the host computer (HOST);
   c. The user clicks on the login link inside the web page of the remote server (SRV);
   d. The user authenticates to the network device (NSC) through the login page opened when clicking the login link, by using an authentication method of the network device (NSC); and
   e. Upon authentication of the user, the network device (NSC) sends the authentication credential to the remote server (SRV) in order to authenticate the user to the remote server (SRV).

* * * * *